March 2, 1937.          J. S. YAGER          2,072,786
WILD GOOSE AND DUCK CALL
Filed Feb. 10, 1936
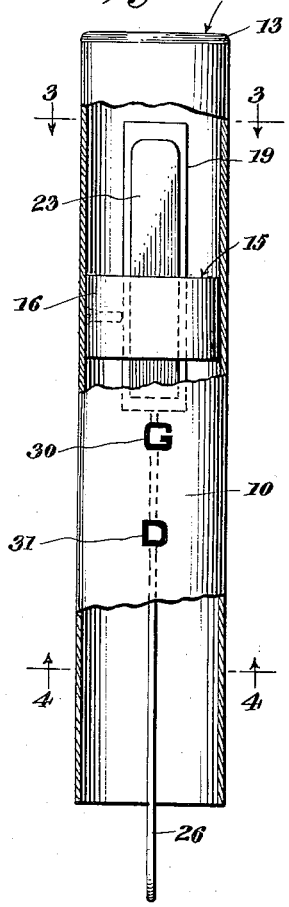
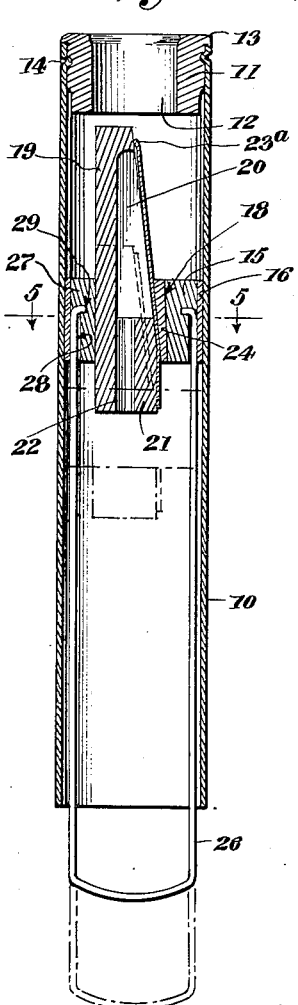
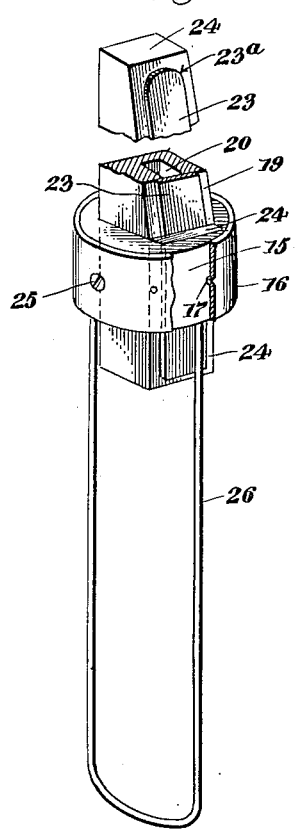
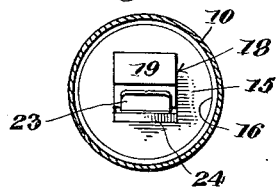
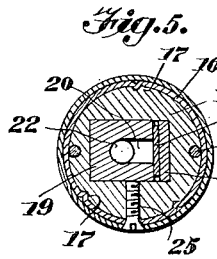
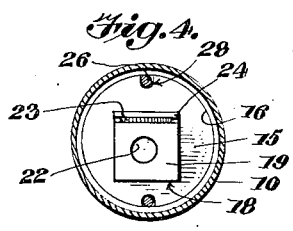
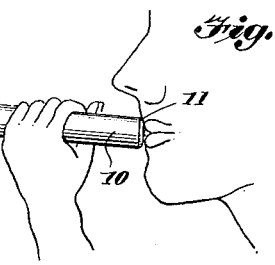
Inventor
JOSEPH S. YAGER
By Irving L. McCathran
Attorney Patented Mar. 2, 1937

2,072,786

UNITED STATES PATENT OFFICE 2,072,786

WILD GOOSE AND DUCK CALL

Joseph S. Yager, Greenville, Miss.

Application February 10, 1936, Serial No. 63,269

3 Claims. (Cl. 46—180)

This invention relates to a wild goose and duck call and has for one of its objects the production of a simple and efficient instrument which is designed to simulate the call of a wild goose and a wild duck.

A further object of this invention is the production of a simple and efficient instrument which is easily adjustable to permit the operator to sound the call of a wild goose, duck, and the like.

Other objects of this invention will appear throughout the following specification and claims.

In the drawing:

Figure 1 is a side elevation of the instrument, certain parts being broken away;

Figure 2 is a longitudinal section therethrough;

Figure 3 is a section taken on line 3—3 of Figure 1;

Figure 4 is a section taken on line 4—4 of Figure 1;

Figure 5 is a section taken on line 5—5 of Figure 2;

Figure 6 is a sectional perspective view of the sound box, supporting and operating means therefor; and Figure 7 is a side elevation showing the manner of blowing or sounding the wild goose and duck call.

By referring to the drawing, it will be seen that 10 designates the hollow metallic tube which constitutes the body or casing, the tube 10 being preferably formed of brass and nickle plated upon its outer surface. An annular ring or mouth-piece 11 is fitted in one end of the tube 10 and is provided with an enlarged central bore 12. The mouth-piece 11 is preferably provided with an annular flange 13 at its outer end which overhangs the outer end of the tube 10 as shown in Figure 2. The tube 10 is provided with inwardly punched portions 14 which bite into the side of the mouth-piece 11 and firmly hold the mouth-piece 11 in position.

A wooden filler 15 is slidably mounted within the tube 10 and a relatively wide brass band 16 is preferably fixed to the outer surface of the filler 15 to provide a tight fit and wide bearing face for the filler 15 within the bore of the tube 10, as shown in Figure 1. This band 16 is preferably held in place upon the filler 15 by means of the punched portions 17 which bite into the wooden filler 15, as shown in Figure 5. The filler 15 is provided with a square aperture 18 into which fits the sound box 19.

The sound box 19 consists of an elongated tapering box structure having an elongated channel 20 formed in one face terminating short of both ends of the box 19. The outer end 21 of the sound box 19 is provided with an escapement port 22 which communicates with the channel 20. A metallic reed 23 is carried by one face of the sound box 19 and overlies the channel 20 and constitutes a closure therefor. The sound box 19 is preferably wedge-shaped with the narrow end 24 near the mouth-piece 11, as shown in Figure 2. The tongue or reed 23 is firmly held in position by means of the wedge block 24 which fits between the reed 23 and the wall of the square aperture 18, as shown in Figures 2, 5 and 6. The tongue or reed 23 is round at its outer end, as at 22a, and is also bent slightly inwardly toward the sound box 24 at its extremity, as will be noted by considering Figure 2. This structure will facilitate the operation of the reed when air pressure strikes the top of the reed while passing through the tube 10 from the mouth-piece 11. A binding screw 25 extends through the filler 15 and engages one side of the sound box 19 to lock the sound box 19 in an adjusted position.

An elongated operating loop 26 is secured to the filler 15 and this loop 26 is preferably formed of a U-shaped wire having its ends bent inwardly to provide anchoring portions 27. The inner ends of the loop 26 fit in the longitudinal channels 28 formed in the sides of the filler 15 and the anchoring portions 27 fit in the sockets 29 formed at the inner ends of the channels 28. The band 16 will firmly hold the operating loop 26 against displacement with respect to the filler 15.

The outer or closed end of the loop extends out through the outer open end of the tube 10 to permit an operator to extend his finger through the closed end of the loop and obtain a firm grip thereon for the purpose of moving the filler 15 to an adjusted position as will be obvious by considering Figure 2. Because of the thickness of the band 16 the U-shaped loop 26 is spaced from the inner wall of the tube 10, as also shown in Figure 2.

The tube 10 preferably marked with the letter G in the position indicated by the numeral 30 and with the letter D in the position indicated by the numeral 31 whereby the operator may properly gage the position of the filler 15 to produce either the wild goose or duck call. When the filler 15 is in a position to register with the letter G the wild goose call may be produced and when the filler 15 is in a position to register with the letter D the wild duck call may be produced or sounded upon the instrument.

It should be understood that the filler 15, sound box 19, and its accompanying parts, and the operating loop 26 constitute the sound element which is slidably mounted within the tube or casing 10.

The operation of the device is as follows:—

If it is desired to imitate the call of the wild goose, the filler 15 is moved to the position indicated by the letter G by pulling outwardly upon the operating loop 26 and the mouth-piece 11 is placed against the lips of the operator, as indicated in Figure 7. The operator will then blow upon the mouth-piece in a manner similar to that of blowing a bugle, using the tongue as a stop, and the operator will blow a short abrupt tone letting the tongue go forward at the end of the tone so as to cut off the tone quickly. If it is desired to imitate the call of the wild duck, the filler 15 is moved to the position indicated by the letter D, or anywhere below this letter, by pulling outwardly upon the loop 26 and then blowing upon the mouth-piece in a manner in which a duck call is usually sounded, and the desired results will be obtained. By using the wooden sound box as defined above, I have found that the metallic sound which has ordinarily been very undesirable in those instruments now commonly used, is avoided.

It should be understood that certain detail changes in the mechanical construction may be employed without departing from the spirit of the invention, so long as such changes fall within the scope of the appended claims.

Having described the invention, what is claimed as new is:

1. A device of the class described comprising a hollow tube having a mouth-piece fixed within one end thereof, the opposite end of the tube being open, a slidable filler mounted within said hollow tube, a sound element adjustably mounted within said slidable filler, an operating loop fixed to said filler and extending longitudinally of the tube, said operating loop extending out through the open end of said tube whereby the outer end of the loop may be engaged by the finger of an operator for slidably adjusting said filler within the tube to provide a series of selected tonal effects when an operator blows through the mouth-piece.

2. A wild goose and duck call comprising a hollow tubular member having a mouth-piece fitted in one end thereof, a slidable filler slidably mounted within the tube, a sound box fitted within the filler, said filler having a relatively wide band fixed to its periphery to provide a right fit and wide bearing face within the tube, a substantially U-shaped operating loop having its inner ends engaging said filler and fitting under said band, said filler having sockets in its periphery, the terminals of the loop being inturned and fitting in said sockets, the band holding the inner terminals of the loop snugly within the sockets, the loop extending longitudinally of the tube and projecting from the open end thereof whereby the filler may be adjusted within the length of the tube by outward and inward sliding movement of the loop with respect to the tube.

3. A wild goose and duck call comprising a hollow tube having a mouth-piece fitted within one end thereof, a filler slidably mounted within the tube, and extending toward the mouth-piece, said filler having longitudinally extending diametrically arranged channel portions formed in the periphery thereof, an operating loop having a pair of parallel strands the inner ends of which fit within said channels, said filler having inturned sockets at the inner ends of the channels, the terminals of the strands being inturned and fitting in said sockets, the loop extending outwardly of the outer end of the tube, and a retaining and bearing band surrounding the periphery of said filler for retaining the inner ends of the operating loop in fixed engagement with the filler and also providing a bearing face for contact with the inner walls of said tube.

JOSEPH S. YAGER.